United States Patent
Lee

(10) Patent No.: US 10,697,535 B2
(45) Date of Patent: Jun. 30, 2020

(54) TRANSMISSION ACTUATOR FOR TRACTOR

(71) Applicant: LS MTRON LTD., Anyang-si, Gyeonggi-do (KR)

(72) Inventor: Sang Heon Lee, Suwon-si (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 449 days.

(21) Appl. No.: 15/537,638

(22) PCT Filed: Dec. 24, 2015

(86) PCT No.: PCT/KR2015/014250
§ 371 (c)(1),
(2) Date: Jun. 19, 2017

(87) PCT Pub. No.: WO2016/105155
PCT Pub. Date: Jun. 30, 2016

(65) Prior Publication Data
US 2017/0350502 A1 Dec. 7, 2017

(30) Foreign Application Priority Data

Dec. 24, 2014 (KR) .................. 10-2014-0188060
Dec. 23, 2015 (KR) .................. 10-2015-0184622

(51) Int. Cl.
*F16H 61/12* (2010.01)
*F16H 61/32* (2006.01)
(Continued)

(52) U.S. Cl.
CPC ............ *F16H 61/12* (2013.01); *F16H 59/70* (2013.01); *F16H 61/32* (2013.01); *F16H 63/30* (2013.01);
(Continued)

(58) Field of Classification Search
CPC .. F16H 61/12; F16H 61/32; F16H 2059/6823; F16H 63/30
(Continued)

(56) References Cited

U.S. PATENT DOCUMENTS 5,487,318 A    1/1996   Schott
5,878,624 A *  3/1999   Showalter ............ F16H 63/304
                                                    74/473.37

(Continued)

FOREIGN PATENT DOCUMENTS

CN    103967969 A    8/2014
JP    05-322031 A    12/1993
(Continued)

OTHER PUBLICATIONS

Search Report, dated Mar. 16, 2016, for International Application No. PCT/KR2015/014250.
(Continued)

*Primary Examiner* — Ha Dinh Ho
(74) *Attorney, Agent, or Firm* — K&L Gates LLP

(57) ABSTRACT

A transmission actuator for tractor includes: a motor which provides power; rails which are movable by operating the motor; a rail sensor which detects a neutral state of the rails; a position sensor which detects a movement displacement of the rails; and a rotation sensor which is mounted to the motor to detect the number of revolutions of the motor.

6 Claims, 8 Drawing Sheets

(51) Int. Cl.
*F16H 59/68* (2006.01)
*F16H 63/30* (2006.01)
*F16H 59/70* (2006.01)
*F16H 63/42* (2006.01)
*B62D 49/00* (2006.01)

(52) U.S. Cl.
CPC .......... *F16H 63/304* (2013.01); *F16H 63/42* (2013.01); *B62D 49/00* (2013.01); *F16H 2059/6823* (2013.01); *F16H 2061/1212* (2013.01); *F16H 2061/1216* (2013.01)

(58) Field of Classification Search
USPC .......................................................... 74/335
See application file for complete search history.

(56) References Cited

U.S. PATENT DOCUMENTS

| | | | |
|---|---|---|---|
| 5,884,526 A * | 3/1999 | Fogelberg | B60K 17/344 |
| | | | 192/82 P |
| 6,155,126 A * | 12/2000 | Vogt | F16H 59/70 |
| | | | 74/335 |
| 6,382,040 B1 | 5/2002 | Diangelo et al. | |
| 7,104,150 B2 | 9/2006 | Ito et al. | |
| 8,555,743 B2 | 10/2013 | Woo | |
| 9,114,699 B2 * | 8/2015 | Takei | B60K 6/365 |
| 2011/0035122 A1 | 2/2011 | Katrak | |

FOREIGN PATENT DOCUMENTS

| | | |
|---|---|---|
| JP | 2002-168347 A | 6/2002 |
| JP | 2004-324772 A | 11/2004 |
| JP | 2012-163197 A | 8/2012 |
| KR | 10-2012-0060074 A | 6/2012 |
| KR | 10-2012-0060482 A | 6/2012 |

OTHER PUBLICATIONS

Written Opinion, dated Mar. 16, 2016, for International Application No. PCT/KR2015/014250.

* cited by examiner

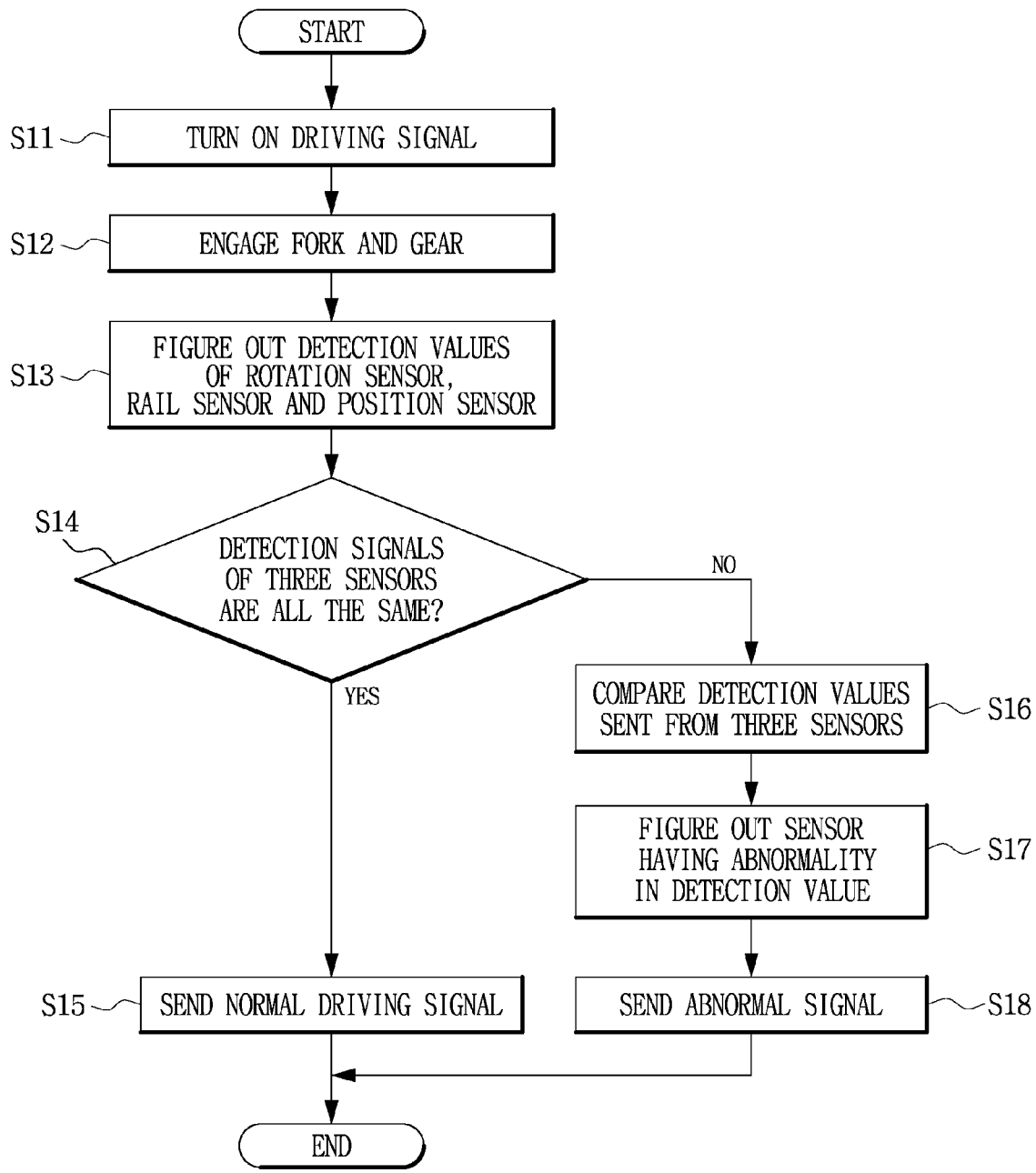

TRANSMISSION ACTUATOR FOR TRACTOR

CROSS-REFERENCE TO RELATED APPLICATION(S)

The present application is a U.S. National Phase entry from International Application No. PCT/KR2015/014250, filed Dec. 24, 2015, which claims priority to Korean Patent Application Nos. 10-2014-0188060, filed Dec. 24, 2014, and 10-2015-0184622, filed Dec. 23, 2015, the disclosures of which are incorporated by reference herein in their entireties.

BACKGROUND OF THE INVENTION

1. Field of the Invention

This disclosure relates to an actuator for providing power to change a moving speed of a tractor or change a moving direction of the tractor into a forward or rearward direction, and in more detail, relates to an actuator capable of accurately detecting a location of a rail or a fork by adding a plurality of sensors for detecting a location and neutral state of the rail.

2. Description of Related Art

Generally, a tractor is an agricultural device having a lower link to which various work machines may be attached depending on the work purpose. Like a regular vehicle, the tractor has a transmission for gear shifting. The transmission is equipped with a synchronizer for gear shifting of the vehicle or forward/rearward travel of the vehicle. The synchronizer synchronizes a relative speed of an output unit with an input unit including a clutch, through a sleeve connected to a transmission lever, when a driver moves the transmission lever for gear shifting.

The sleeve of the synchronizer is operated by a fork, a rail and a transmission lever. Specifically, when a driver moves the transmission lever, the rail and the fork connected thereto are moved together. The fork is connected to the sleeve. Thus, by moving the fork, the sleeve is moved together to shift gears of the tractor.

Recently, a tractor uses a hydraulic or electric motor-type actuator which allows automatic gear shifting for the transmission. Specifically, the actuator includes a motor and a rail which is moved by the power provided by the motor. The tractor shifts gears by the movement of the rail.

According to the existing technique, a sensor for sensing a position of the rail is coupled to the motor. Therefore, in the existing technique, a travel direction or distance of the rail is predicted based on the number of revolutions of the motor. However, the power provided by the motor is provided to the rail through a plurality of configurations, and in fact, the gear shifting of the tractor takes place according to the movement of the rail. Therefore, if the rail does not actually work, the sensor coupled to the motor may not detect this error.

Korean Unexamined Patent Publication No. 2012-0060482 discloses a transmission method for a tractor and a transmission control device using the control method. In this document, a control method for determining whether or not to perform gear shifting according to a pressure value measured by a pressure sensor is disclosed. However, even with the pressure sensor, it is difficult to accurately figure out an actual position of the rail.

SUMMARY OF THE INVENTION

The present disclosure has been designed to overcome the limitations and problems of the existing technique as described above, and the present disclosure provides a transmission actuator for a tractor, which may detect a failure when a rail does not actually operate or the operation of the rail is erroneous.

In one general aspect, there is provided a transmission actuator, comprising: a motor configured to provide power; rails configured to be movable by operating the motor; a rail sensor configured to detect a neutral state of the rails; a position sensor configured to detect a movement displacement of the rails; and a rotation sensor mounted to the motor to detect the number of revolutions of the motor.

The rail sensor may be directly coupled to one surface of the rails, and the position sensor may be coupled to the rails by means of a sensor arm formed at one side of the rails and extending in a direction perpendicular to an extending direction of the rails.

The sensor arm may be coupled to a hinge protruding from one surface of the rails.

The transmission actuator may further comprise a controller configured to determine an abnormal gear shifting state by figuring out locations of the rails according to the detection information of the rail sensor, the position sensor and the rotation sensor.

When it is determined that there is an abnormal gear shifting state, the controller may operate an alarm to send an alarm signal in relation to the abnormal gear shifting state to a driver or operate a display to visually indicate a signal in relation to the abnormal gear shifting state.

When a driving signal is transmitted to the controller, the controller may figure out detection values of the rotation sensor, the rail sensor and the position sensor and determine whether the detection values transmitted from the sensors are all the same.

When the detection values of the rotation sensor, the rail sensor and the position sensor are all the same, the controller may send a normal driving signal to the outside, and when the detection values of the rotation sensor, the rail sensor and the position sensor are not all the same, the controller may figure out a sensor having a problem and send an abnormal driving signal to the outside.

Advantageous Effects

According to the present disclosure proposed herein, since the rail is equipped with a position sensor for detecting a position of the rail by a sensor arm, it is possible to accurately detect a malfunction of the rail.

In addition, since a rail sensor for detecting a neutral state of the rail directly is coupled to the rail, it is possible to more accurately determine whether the rail is actually operating.

Moreover, since a user may determine whether the tractor performs operation or gear shifting properly through a rotation sensor directly coupled to the position sensor, the rail sensor and the motor, it is possible to improve the working reliability.

BRIEF DESCRIPTION OF DRAWINGS

FIG. 7 is a flowchart for schematically illustrating an operating process of the tractor.

DETAILED DESCRIPTION OF THE INVENTION

Figure 1:
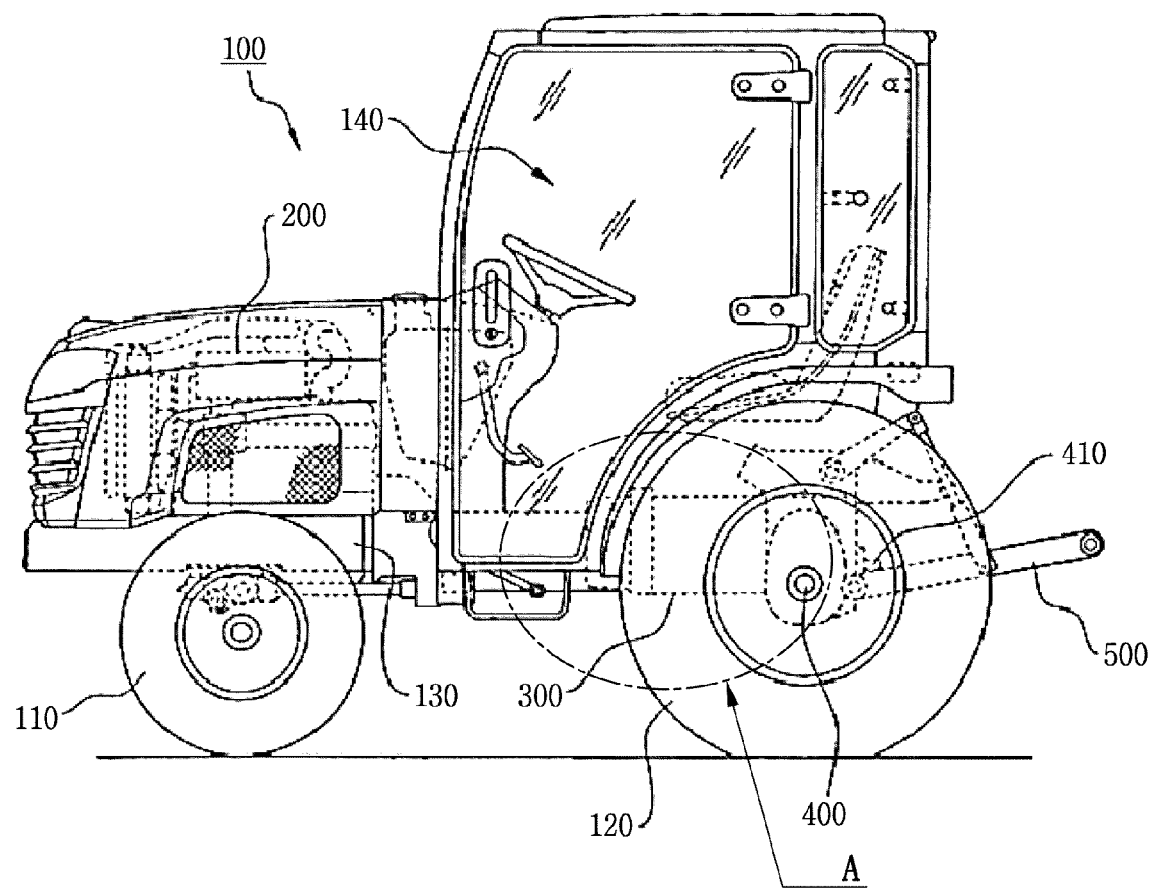
FIG. 1 is a diagram showing a tractor according to an embodiment of the present disclosure.

Hereinafter, an embodiment of the present disclosure will be described with reference to the drawings. Even though the present disclosure is described based on the embodiment depicted in the drawings, this is just an example, and the essential configuration and operations of the present disclosure are not limited thereto.

FIG. 1 is a diagram showing a tractor according to an embodiment of the present disclosure.

Referring to FIG. 1, a tractor 100 according to the present disclosure includes a steering front wheel 110 for adjusting a travelling direction and a driving rear wheel 120 for driving a vehicle. The steering front wheel 110 is coupled to a guide bar 130 via an axle.

In addition, an engine 200 and a transmission 300 are mounted sequentially in the tractor 100 from the front to the rear. Also, a driver 140 rides on an upper portion of the transmission 300, and a rear axle 400 is connected to the rear portion of the transmission 300 to operate the rear wheel 120. In addition, at a PTO transmission portion of the transmission 300, a PTO shaft 410 extends forward, middle, or rearward to connect with a working machine.

Figure 2A:
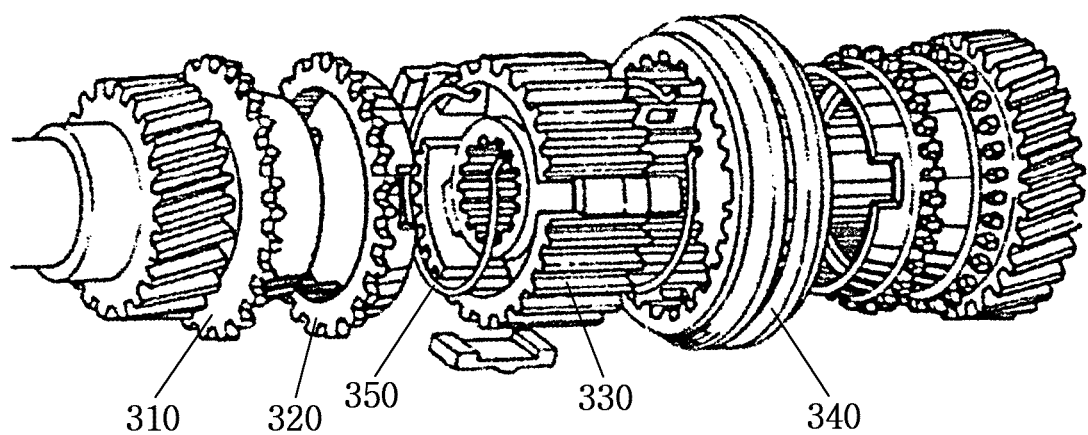
FIGS. 2A and 2B are enlarged view showing a portion A of FIG. 1, which depicts a transmission.
Figure 2B:
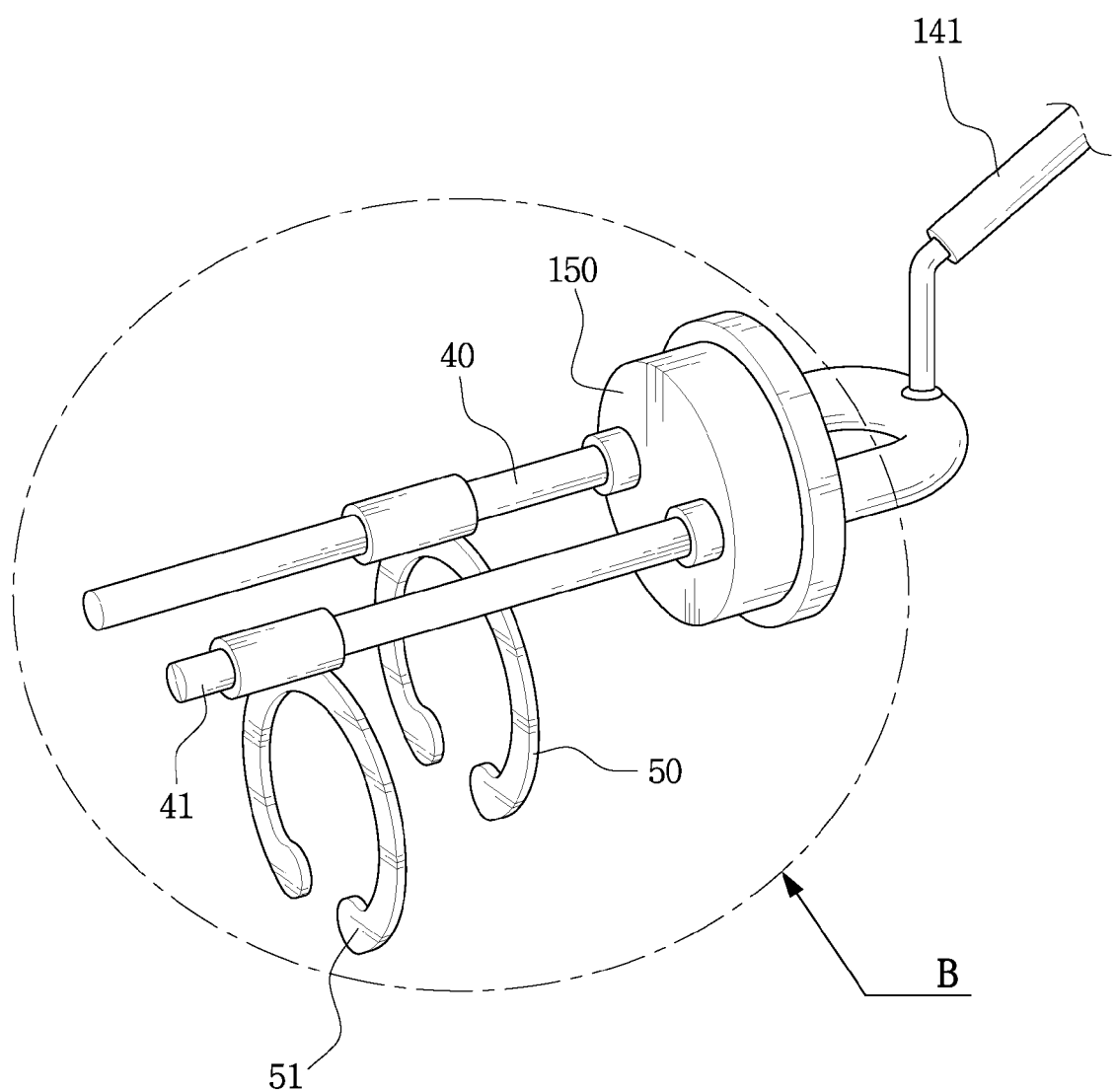

FIG. 2 is an enlarged view showing a portion A of FIG. 1, namely a part of the interior of the transmission 300. In detail, FIG. 2A shows a synchronizer of transmission 300, and FIG. 2B shows a mechanism for operating the synchronizer.

First, referring to FIG. 2A, a transmission (see a reference sign 300 in FIG. 1) of the tractor is equipped with a synchronizer for gear shifting or forward/rearward travel of the vehicle. The synchronizer means a device which synchronizes a relative speed of an output unit for giving power and an input unit for receiving power, when a driver operates a transmission lever (see a reference sign 141 in FIG. 2B) for gear shifting.

The synchronizer includes a clutch gear 310, a synchronizer ring 320, a clutch hub 330, a clutch sleeve 340 and a key spring 350.

If a user manipulates the transmission lever, a signal output from the transmission lever is transmitted to the synchronizer. In addition, the synchronizer compares the signal of the transmission lever with a current state to match the relative speed of the output unit and the input unit.

A detailed configuration for transmitting the signal from the transmission lever to the synchronizer is shown in FIG. 2B.

Referring to FIGS. 2A and 2B, a plurality of rails 40 and 41 and a plurality of forks 50 and 51 coupled to the plurality of rails 40 and 41 are installed at one end of the transmission lever 141. For example, one rail 40 among the plurality of rails may be a forward shift rail, and another rail 41 of the plurality of rails may be a rear shift rail. However, the kind and number of rails are not limited thereto.

If a user operates the transmission lever 141, one of the plurality of rails is moved according to the operation signal. At this time, the movement of the rail 40, 41 may be performed by the power provided a driving unit 150. The driving unit 150 includes an engine (see a reference sign 10 in FIG. 3) and a reduction gear (see a reference sign 20 in FIG. 3).

As the rail moves, the fork 50, 51 fixed to the rail moves together. The fork which has moved together with the rail is engaged with a clutch sleeve (see a reference sign 340 of FIG. 2A) and moves the clutch sleeve, thereby performing gear shifting to the tractor (see a reference sign 100 of FIG. 1).

Specifically, the fork 50, 51 may move the clutch sleeve 340 in a state of wrapping the outer surface of the clutch sleeve. The clutch sleeve 340 surrounds a clutch hub 330 fixed to the shaft and is movable in a width direction of the clutch hub 330. In addition, synchronizer rings 320 are engaged at both sides of the clutch sleeve 340, and the clutch sleeve 340 and the synchronizer ring 320 move together.

If the transmission lever 141 is operated by the user, the driving unit 150 operates to move any one of the rails 40, 41, and the fork 50, 51 fixed to the rail 40, 41 is moved together with the rail 40, 41. As the fork 50, 51 moves, the clutch sleeve 340 engaged with the fork 50, 51 and the synchronizer ring 320 engaged with the clutch sleeve 340 are engaged with the clutch gear 310 which is idling on the axle. Thus, the gear 310 rotates to transmit a rotational force to another gear (not shown) engaged with the clutch gear 310.

Hereinafter, a transmission actuator including the driving unit 150 will be described in detail.

Figure 3:
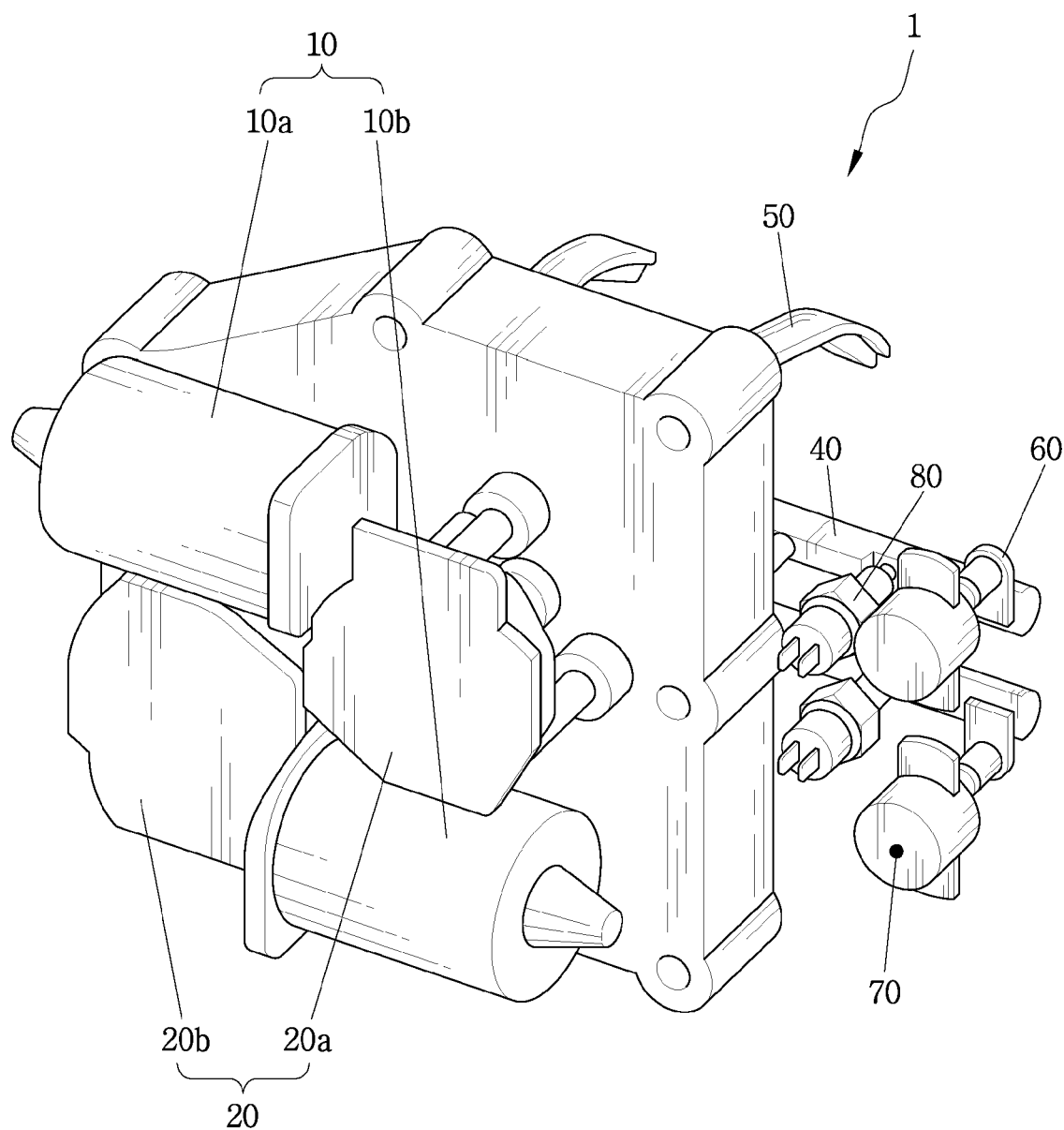
FIG. 3 is a perspective view showing a detailed example of a portion B of FIG. 2B, which depicts a front portion of a transmission actuator according to an embodiment of the present disclosure.
Figure 4:
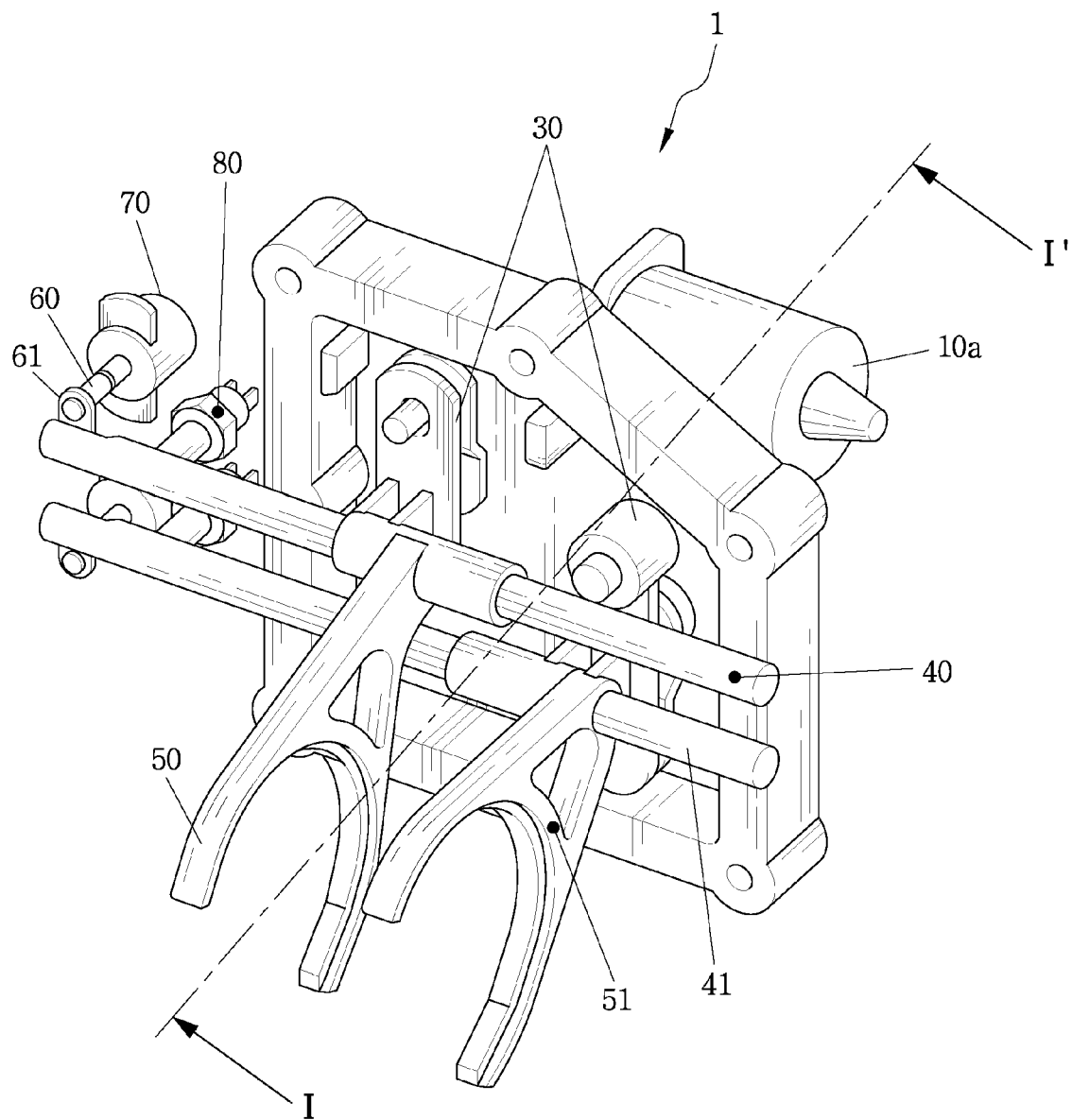
FIG. 4 is a perspective view showing a rear portion of the transmission actuator.

FIG. 3 is a perspective view showing a detailed example of a portion B of FIG. 2B, which depicts a front portion of a transmission actuator according to an embodiment of the present disclosure. FIG. 4 is a perspective view showing a rear portion of the transmission actuator, and FIG. 5 is a cross-sectional view, taken along the line I-I' of FIG. 4.

Figure 5:
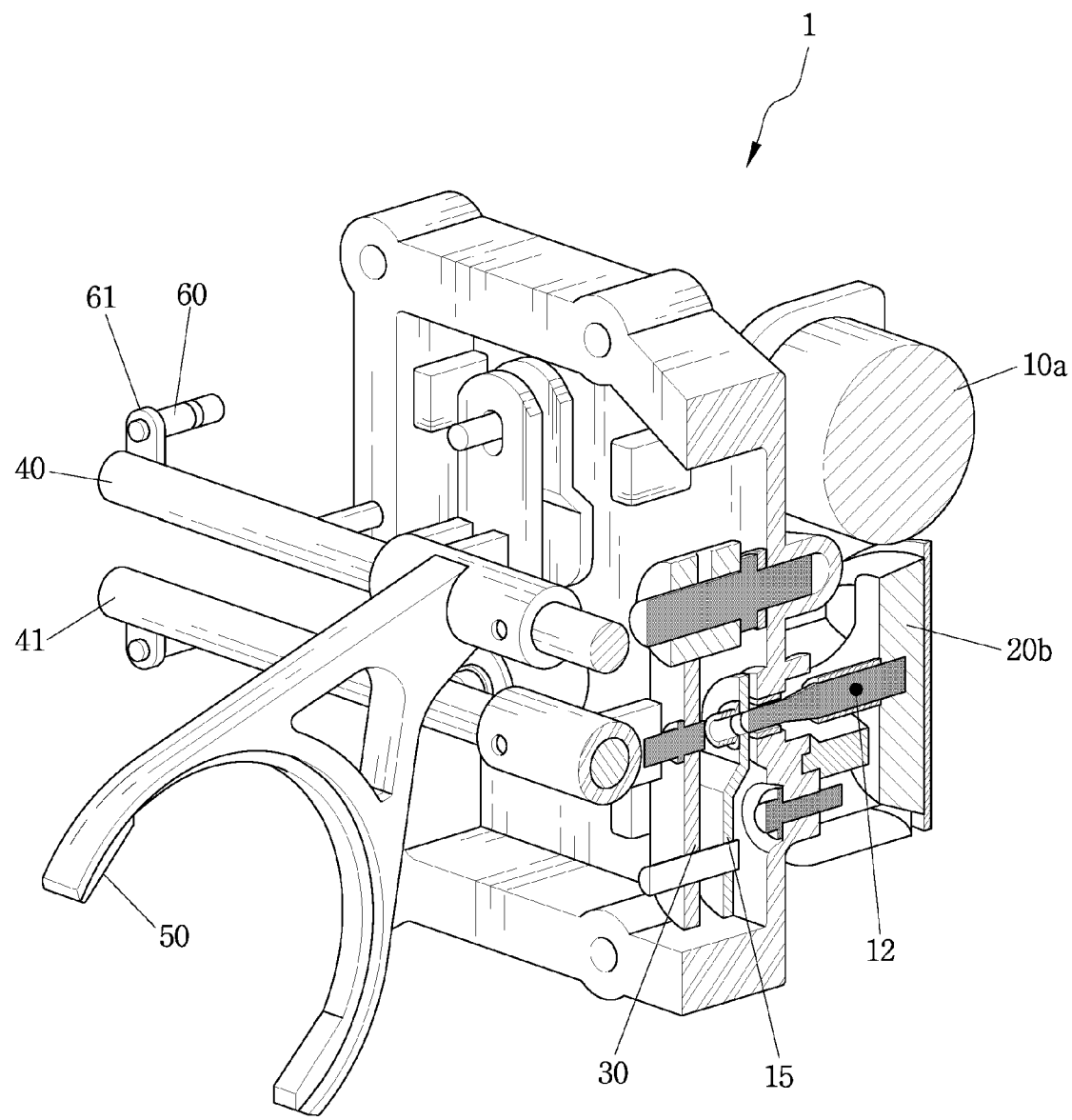
FIG. 5 is a cross-sectional view, taken along the line I-I' of FIG. 4.

Referring to FIGS. 3 to 5, a transmission actuator 1 according to the present disclosure is operated by the power provided by the motor 10. A plurality of motors 10 may also be used. However, since the power transmission processes provided from the plurality of motors 10 are the same, a single motor 10b will be described as an example for convenience of explanation.

The motor 10b rotates in a clockwise or counterclockwise direction depending on an electric signal. Also, the rotational speed of the motor 10b is determined according to the electric signal, and the power provided by the motor 10b is transmitted to a reduction gear 20b disposed at one side of the motor 10b.

The reduction gear 20b increases or decreases the power transmitted by the motor 10b. In detail, the reduction gear 20b is connected to the motor 10b by a predetermined axis, and the power generated by the rotation of the motor 10b is transmitted to the reduction gear 20b.

A motor output shaft 12 is connected to a center portion of the reduction gear 20b. The motor output shaft 12 transmits the power, which has been increased or decreased as passing through the reduction gear 20b, to a motor arm 15. Accordingly, the motor arm 15 may rotate in a clockwise or counterclockwise direction. In detail, the power transmitted from the motor output shaft 12 to the motor arm 15 is transmitted to a rotatable operation arm 30. According to the rotation of the motor arm 15 in the clockwise or counterclockwise direction, the operation arm 30 may rotate in the same direction as the motor arm 15.

In addition, the operation arm 30 is connected directly to rail 41. Referring to FIG. 5, if the operation arm 30 rotates, the rail 41 may be moved according to the rotation of the operation arm 30.

Likewise, the power supplied from another motor 10a disposed at an upper portion of the motor 10b is provided to the rail 40 located above the rail 41 via a reduction gear 20a disposed at one side of the motor 10a.

The fork 50 fixed to the rail 40 to move in the same direction as the rail 40 is coupled to one side of the rail 40. The fork 50 is a device which is connected to the sleeve of the synchronizer to select a gear of the tractor. In other words, the fork 50 moves in one direction and combines with one gear among a plurality of gears of the tractor.

A rail sensor 80 directly coupled to one side of the rail 40 to detect a neutral state of the rail 40 is installed at the rail 40. In other words, the rail sensor 80 detects whether the rail 40 is in a neutral state or not. If the rail sensor 80 senses the neutral state of the rail 40, the fork 50 will not be in a stage of engaging with a gear, and if the rail sensor 80 detects that the rail 40 is not in the neutral state, the fork will be in a stage of engaging with any one gear among the plurality of gears.

In addition, a position sensor 70 indirectly coupled to the rail 40 by a sensor arm 60 to detect a movement displacement of the rail 40 is installed at another side the rail 40. In detail, the position sensor 70 detects a movement displacement value of the rail 40 which has moved by the power provided by the motor 10. Thus, the controller 150 may determine a current gear stage of the tractor by figuring out the current position of the rail 40 according to the information detected by the position sensor 70.

The sensor arm 60 is configured to connect the rail 40 and the position sensor 70 and extends in a direction perpendicular to the extending direction of the rail 40. The sensor arm 60 is coupled to the rail 40 by a hinge 61. In detail, the hinge 61 may be rotated by the movement of the rail 40. As a result, the sensor arm 60 and the position sensor 70 are rotated together with the rotational motion of the hinge 61. Thus, the controller 150 may figure out a position of the rail 40 based on the rotation of the position sensor 70.

Meanwhile, a rotation sensor (not shown) for detecting a rotation speed or amount of the motor 10 is installed at the motor 10. Thus, the controller 150 may figure out a location of the rail 40 based on the information detected by the rotation sensor.

Hereinafter, a process of transmitting the information detected by a plurality of sensors to a driver through a signal of the controller will be schematically described with reference to FIG. 6.

Figure 6:
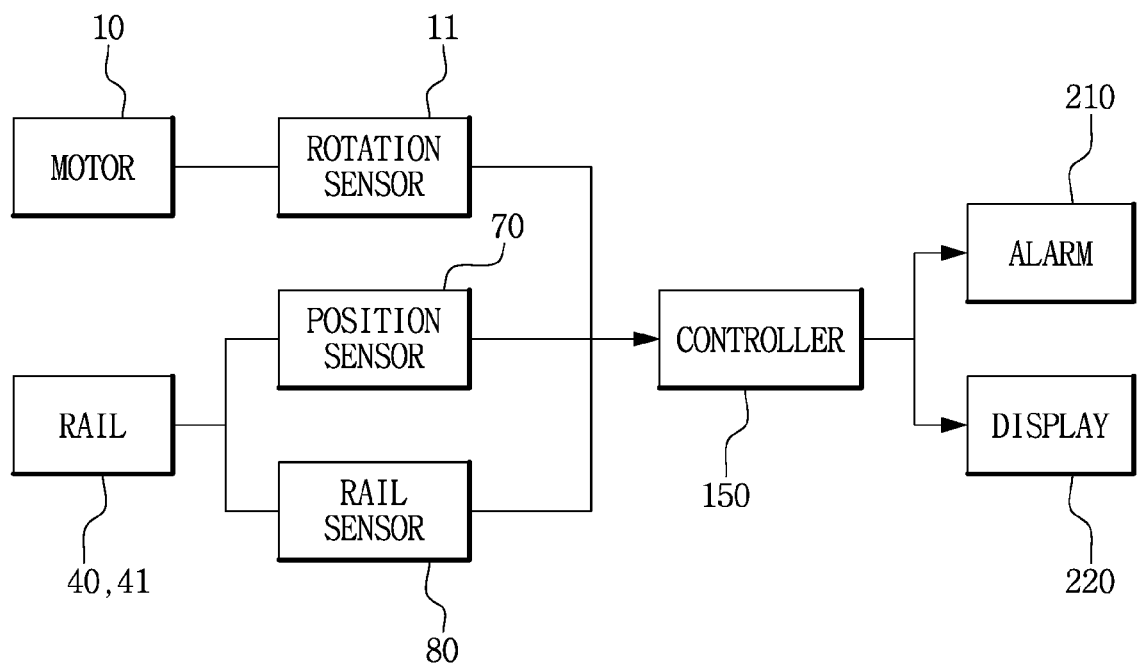
FIG. 6 is a schematic block diagram for illustrating a process of transmitting information detected by a plurality of sensors to a driver.

Referring to FIG. 6, the rotation sensor 11 coupled to the motor 10 detects the rotation of the motor 10, the rail sensor 80 directly coupled to the rail 40 detects the neutral state of the rail 40, and the position sensor 70 indirectly coupled to the rail 40 detects the movement displacement of the rail 40.

The information sensed by the rotation sensor 11, the position sensor 70 and the rail sensor 80 is transmitted to the controller 150. The controller 150 figures out accurate positions of the rail 40 and the fork 50 based on the information detected by the sensors 11, 70, 80.

After that, the controller 150 compares the position of the transmission lever operated by the driver with the information detected by the sensors 11, 70, 80 to determine whether an abnormal gear shifting state exists. If it is determined that gear shifting is abnormal, the controller 150 activates an alarm 210 to send an alarm to the driver or activates a display 220 to visually indicate the abnormal gear shifting state to the driver.

Hereinafter, a process of driving the tractor 100 performing gear shifting according to the present disclosure will be described in more detail with reference to the drawings.

FIG. 7 is a flowchart for schematically illustrating an operating process of the tractor.

Referring to FIG. 7, a user sends a driving signal to the tractor 100 in a stopped state to drive the tractor 100 for the purpose of work or the like (S11). This driving signal is transmitted to the controller 150, and the controller 150 controls according to the driving signal so that one of the forks 50, 51, for example the fork 50 located at an upper side, and one gear of the plurality of gears are engaged (S12). In other words, the neutral state of one rail 40 is released according to the control signal of the controller 150.

After that, the controller 150 figures out the detection values of the rotation sensor 11 which detects the rotation of the motor 10a, the rail sensor 80 which detects the neutral state of the rail 40, and the position sensor 70 which detects the movement displacement of the rail 40 (S13). In detail, the rotation sensor 11 is installed at the motor 10a to figure out a current stage of the transmission of the tractor by detecting the rotation of the motor 10a, the rail sensor 80 is directly coupled to the rail 40 to figure out whether the transmission of the tractor is in a neutral state, and the position sensor 70 is indirectly coupled to the rail 40 by the sensor arm 60 to figure out a current stage of the transmission of the tractor.

If the detection of the rotation sensor 11, the rail sensor 80 and the position sensor 70 is completed, the controller 150 determines whether the signal values detected by three sensors are all the same (S14). In other words, the controller 150 determines whether the current stages of the transmission of the tractor detected by the rotation sensor 11 and the position sensor 70 coincide with each other and whether the neutral state of the transmission of the tractor detected by the rail sensor 80 is in agreement with the current stage of the transmission of the tractor according to the detection values of the rotation sensor 11 and the position sensor 70. If the detection values of three sensors 11, 70, 80 are all the same, it may be regarded that the tractor performs gear shifting properly, and the controller 150 transmits a normal driving signal to the user (S15).

On the contrary, if it is figured out in S14 that the detection values of three sensors are not all the same, the controller 150 compares the detection signals of three sensors 11, 70, 80 (S16). Through the comparison of the detection signals, the controller 150 may figure out which sensor has a problem (S17).

After figuring out which sensor has a problem, the controller 150 may send an abnormal signal to the outside by operating the alarm 210 or the display 220 so that the user may recognize the problem (S18).

For example, if the detection values of the rail sensor 80 and the position sensor 70 are identical to each other and the detection value of the rotation sensor 11 is not identical thereto, controller 150 may determine that the rotation sensor 11 has a problem or a configuration for transmitting power from the motor 10 to the rails 40, 41 has a problem. In this case, the user may solve this problem by checking whether the motor 10 operates normally, checking the power transmitting configuration including the motor arm 15 and the operation arm 30, or checking the rotation sensor 11 attached to the motor 10.

As another example, if the detection values of the rotation sensor 11 and the rail sensor 80 are identical to each other and the detection value of the position sensor 70 is not identical thereto, the controller 150 may determine that the position sensor 70 has a problem. In this case, the user may solve the problem by checking the position sensor 70.

As another example, if the detection values of the rotation sensor 11 and the position sensor 70 are identical to each other and the detection value of the rail sensor 80 is not identical thereto, the controller 150 may determine that the rail sensor 80 has a problem. In this case, the user may solve this problem by checking the rail sensor 80.

In the existing technique, a position of a rail has been detected by only the information detected by a rotation sensor mounted at a motor. The rotation sensor is not able to easily detect an exact position of the rail because it is difficult to detect any abnormality in any one of the power transmission structures from the motor to the rail.

However, according to the present disclosure, since the rail sensor 80 and the position sensor 70 are coupled to the rails 40, 41 together with the rotation sensor, the problem of the existing technique may be solved.

The embodiments of the present disclosure have been described in detail with reference to the accompanying drawings, but the present disclosure is not limited to the embodiments but may be modified in various ways without departing from the scope of the present disclosure. Therefore, the embodiments in the present disclosure are not intended to limit the scope of the present disclosure but intended for illustration, and the scope of the present disclosure is not limited to the embodiments. Therefore, the embodiments described above should be understood as being illustrative in all aspects, rather than restrictive. The scope of the present disclosure to be protected should be interpreted based on the appended claims, and all equivalents thereof should be understood as falling within the scope of the present disclosure.

The invention claimed is:

1. A transmission actuator comprising:
   a motor configured to provide power;
   rails configured to be movable by operating the motor;
   a rail sensor configured to detect a neutral state of the rails;
   a position sensor configured to detect a movement displacement of the rails;
   a rotation sensor mounted to the motor to detect the number of revolutions of the motor, and
   a controller configured to determine an abnormal gear shifting state by figuring out locations of the rails according to information detected by the rail sensor, the position sensor, and the rotation sensor.

2. The transmission actuator according to claim 1,
   wherein the rail sensor is directly coupled to one surface of the rails, and
   wherein the position sensor is coupled to the rails by way of a sensor arm formed at one side of the rails and extending in a direction perpendicular to an extending direction of the rails.

3. The transmission actuator according to claim 2,
   wherein the sensor arm is coupled to a hinge protruding from one surface of the rails.

4. The transmission actuator according to claim 1,
   wherein when it is determined that there is the abnormal gear shifting state, the controller operates an alarm to send an alarm signal in relation to the abnormal gear shifting state to a driver or operates a display to visually indicate a signal in relation to the abnormal gear shifting state.

5. The transmission actuator according to claim 1,
   wherein when a driving signal is transmitted to the controller, the controller figures out detection values of the rotation sensor, the rail sensor and the position sensor and determines whether the detection values transmitted from the rotation sensor, the rail sensor, and the position sensor are all the same.

6. The transmission actuator according to claim 5,
   wherein when the detection values of the rotation sensor, the rail sensor and the position sensor are all the same, the controller sends a normal driving signal to outside, and
   wherein when the detection values of the rotation sensor, the rail sensor and the position sensor are not all the same, the controller figures out a sensor having a problem and sends an abnormal driving signal to the outside.

* * * * *